(12) United States Patent
Rambo et al.

(10) Patent No.: US 7,865,361 B2
(45) Date of Patent: Jan. 4, 2011

(54) VOICE QUALITY ANALYSIS TECHNIQUE

(75) Inventors: Darwin Rambo, Surrey (CA); Philip Houghton, Surrey (CA)

(73) Assignee: Broadcom Corporation, Irvine, CA (US)

( * ) Notice: Subject to any disclaimer, the term of this patent is extended or adjusted under 35 U.S.C. 154(b) by 2194 days.

(21) Appl. No.: 10/620,474

(22) Filed: Jul. 16, 2003

(65) Prior Publication Data

US 2005/0015253 A1   Jan. 20, 2005

(51) Int. Cl.
*G10L 21/02* (2006.01)
(52) U.S. Cl. .................. 704/226; 704/200; 704/201; 704/270; 704/272
(58) Field of Classification Search .......... 704/226, 704/216, 200, 201, 270, 272
See application file for complete search history.

(56) References Cited

U.S. PATENT DOCUMENTS

| | | | |
|---|---|---|---|
| 6,999,560 B1 * | 2/2006 | Connor et al. ........... | 379/3 |
| 7,173,910 B2 * | 2/2007 | Goodman ............... | 370/252 |
| 2002/0016937 A1 * | 2/2002 | Houh ..................... | 714/43 |
| 2002/0167937 A1 * | 11/2002 | Goodman ............... | 370/352 |
| 2003/0092394 A1 * | 5/2003 | Gray et al. .............. | 455/67.4 |
| 2004/0071084 A1 * | 4/2004 | El-Hennawey et al. ... | 370/230 |
| 2005/0261895 A1 * | 11/2005 | Bauer et al. ............ | 704/216 |

* cited by examiner

*Primary Examiner*—Qi Han
(74) *Attorney, Agent, or Firm*—McAndrews, Held & Malloy, Ltd.

(57) ABSTRACT

One or more methods and systems of analyzing, assessing, and reporting voice quality scores are presented. In one embodiment, voice quality scores are generated by querying one or more computing devices responsible for processing a reference speech sample input into a voice communication system. In one embodiment, voice quality scores are transmitted by a voice analysis platform and subsequently analyzed. In one embodiment, a single voice analysis platform is used to measure voice quality of a voice communication system. In one embodiment, multiple voice analysis platforms are used to measure voice quality at multiple endpoints of one or more voice communication systems. In one embodiment, the method comprises a user determining one or more points along a communication system where transmitted reference speech samples are to be tapped. The tapped reference speech samples are ported to a voice analysis platform where a voice quality score is generated and graphically displayed.

42 Claims, 7 Drawing Sheets

VOICE QUALITY ANALYSIS TECHNIQUE

RELATED APPLICATIONS

Not Applicable

INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Traditional circuit-switched networks have been designed and optimized for the time-sensitive delivery of voice traffic. As a result, the Public Switched Telephone Network (PSTN) has provided highly predictable quality of service for voice and has become the standard infrastructure for voice transmission. The PSTN delivers toll quality speech primarily by allocating dedicated bandwidth while using non-compression analog-to-digital encoding techniques. Likewise, transmission of predictable voice speech quality has been an important concern for voice that travels through a packet based infrastructure, such as the Internet, because such networks may alter the time sensitive qualities of speech. Recently, the deployment of data networks that facilitate the transmission of voice over Internet Protocol (VoIP), voice over asynchronous transfer mode (ATM), voice over frame relay, wireless, and traditional wireline has created a need to assess the quality of speech being transmitted. When VoIP technology is deployed for voice services on an enterprise or commercial network, users expect a service quality that is tantamount to that of the Public Switched Telephone Network (PSTN).

One of the key drivers behind VoIP network deployments is lower capital costs of implementing voice transmission compared with traditional circuit-switched network deployments. However, it is important that the appropriate IP network architectures and configurations, and VoIP systems, be implemented to deliver appropriate levels of voice service quality. This means that up-front design and purchasing decisions will be critical in the success and payoff of a VoIP strategy. Such decisions begin with assessing the IP network for VoIP performance, prior to VoIP deployment. If the performance of an element in the VoIP communication system degrades the quality of voice significantly, the resulting speech transmitted will be unintelligible. Assessing the voice quality of a VoIP network has not been a simple task.

Voice, being a real-time media, requires quality of service tools that address factors that may affect voice clarity in a VoIP network. Unfortunately, a pre-deployment network assessment may be extremely difficult to obtain. Further, a disadvantage of deploying a VoIP network is the inability to easily and objectively measure the degradation of voice service quality contributed by one or more network elements within a voice transmission network (such as a VoIP network).

There are many factors that influence quality of service of a voice transmission. Of these factors, voice quality may be the most meaningful from the end user's perspective since end users decide what communication services they will pay for and from whom they will buy them. It is from the perspective of the end user that voice quality scores are best defined.

Traditional methods measure voice quality by way of subjective and/or objective voice quality analysis between two endpoints of a voice communication system. One or more algorithms may be applied to the voice received to generate a voice quality score. However, obtaining these voice quality scores at various points along a network is a difficult if not impossible task. Furthermore, the inability to effectively provide this information to a user, such as a network engineer, provides an inefficient and costly approach to designing and troubleshooting a voice communication system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method and apparatus to assess voice quality of a communication system by inputting reference speech samples into a communication system and capturing the reference speech sample at one or more points along the communication system. The captured speech sample is analyzed by a voice analysis platform that utilizes one or more voice quality algorithms to generate one or more voice quality scores. The reference speech sample may comprise a recording of an utterance of particular duration suitable for use by the voice analysis platform. The recording may be sampled and stored in a data file for use by the voice analysis platform. The voice analysis platform may generate statistics related to the voice quality scores.

In one embodiment, the apparatus comprises a voice analysis platform for generating a voice quality score of a communication system comprising at least one reference speech sample generation software, at least one communication software, at least one voice quality scoring software, at least one network interface, and at least one reference speech sample interface. The reference speech sample generation software generates a reference speech sample for transmission into said communication system. The communication software provides configuration data to instruct at least one signal processing device to provide at least one output of the reference speech sample. The voice quality scoring software generates at least one voice quality score of the at least one output of the reference speech sample. The network interface(s) are used for communicating with the at least one signal processing device while the reference speech sample interface(s) are used for communicating with the communication system.

In one embodiment, the apparatus comprises at least a first voice analysis platform and at least a second voice analysis platform. The first voice analysis platform is capable of generating and transmitting a reference speech sample while the second voice analysis platform is capable of receiving the reference speech sample. The second voice analysis platform analyzes the received speech sample and generates a voice quality score. In one embodiment, the first voice analysis platform or the second voice analysis platform analyzes at least one output of said reference speech sample provided at a signal processing point within a signal processing device of said communication system.

In one embodiment, the method comprises a user determining a point along the voice communication system in which a reference speech sample will be tapped. In one embodiment, the method of assessing voice quality in a communication system comprises transmitting reference speech samples, receiving the reference speech samples captured at one or more outputs of a signal processing element of a gateway within the communication system, and determining voice quality scores of the captured reference speech samples. In one embodiment, voice quality scores and statistical information may be graphically displayed to the user.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to assess voice quality of a communication system by inputting one or more streaming reference speech samples into the communication system. The one or more input reference speech samples may be tapped along different processing points within the communication system and analyzed for voice quality by a voice analysis platform. Voice quality scores are generated by the voice analysis platform by applying one or more algorithms to the captured one or more input reference speech sample. The reference speech sample may comprise a recording of speech or an utterance having a duration suitable for use by the voice analysis platform. The recording may be digitally sampled and stored in a data file for use by the voice analysis platform.

The voice analysis platform provides streaming voice data in the form of one or more reference speech samples that are injected and captured at various points within a communication system. The capture points comprise outputs of one or more processing elements of the communication system. The reference speech samples may comprise pre-recorded utterances that may be stored in a storage media of the voice analysis platform. It is contemplated that, in one embodiment, the utterances may be generated in one or more different languages. The voice analysis platform utilizes one or more algorithms to generate a voice quality score from the captured voice data. By way of a display, the voice analysis platform provides a graphical diagram of the communication system tested as well as one or more voice quality scores associated with outputs of one or more processing elements of the communication system. The voice quality scores may be graphically associated with the one or more processing elements. In addition, it is contemplated that the display provides a graphical user interface in which to configure the voice analysis platform. An exemplary monitor may display one or more voice quality scores corresponding to one or more points within the communication system. By assessing the voice quality score at the one or more points within the communication system, the user is able to evaluate the performance after processing is performed by one or more processing elements of the communication system and subsequently isolate one or more network elements that may be responsible for causing a degradation in voice quality.

Figure 1A:
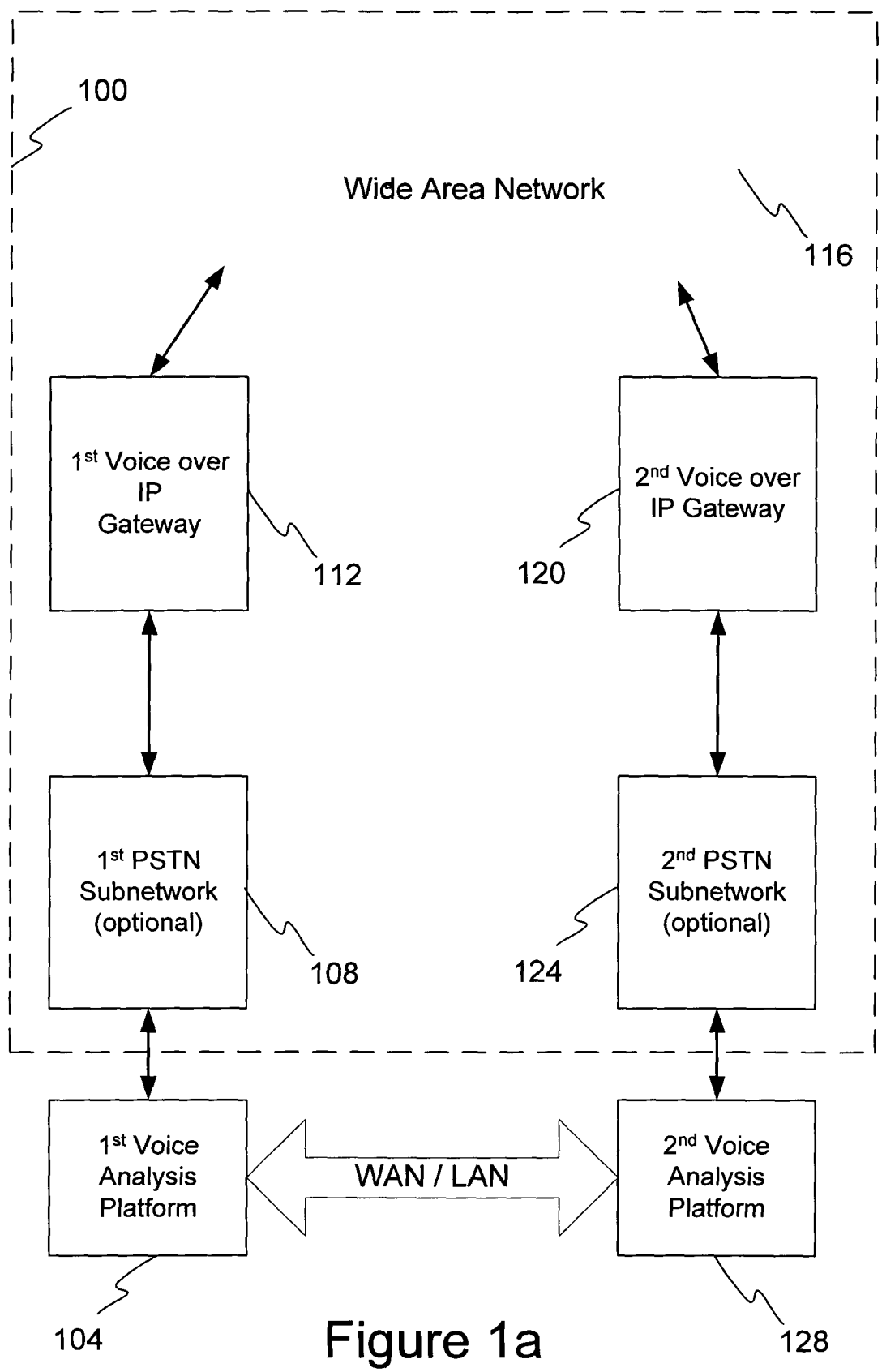
FIG. 1a is a block diagram of a voice test communication system utilizing first and second voice analysis platforms in accordance with an embodiment of the invention.

FIG. 1a is a block diagram of a test configuration of a communication system 100 in accordance with an embodiment of the invention. The test configuration comprises a first voice analysis platform (VAP) 104 transmitting one or more reference speech samples into the communication system 100. The first voice analysis platform 104 may transmit one or more reference speech samples to an exemplary first public switched telephone network (PSTN) subnetwork 108, and an exemplary first voice over IP gateway 112. The first voice over IP gateway outputs the reference speech sample to a public/private network 116 that provides a media in which the reference speech samples are transported from the first voice analysis platform 104 to a second voice analysis platform 128. The public/private network 116 may comprise a public/private wide area network or local area network. The network may comprise a circuit switched or packet switched network. On the receive side, the communication system 100 under test comprises an exemplary second voice over IP gateway 120, and an exemplary second PSTN subnetwork 124. The second voice analysis platform 128 is used to receive the transmitted one or more reference speech samples from the public/private network 116 and perform one or more types of analyses. In one embodiment, the PSTN subnetworks 108, 124 are optional, and the voice analysis platforms 104, 128 interface directly to the voice over IP gateways 112, 120.

The voice analysis platforms 104, 128 may comprise a combination of hardware and software. The locations of each voice analysis platform 104, 128 may correspond, for example, to the locations of the endpoints of the communication system under test. The hardware may comprise one or more computing devices. The computing device may comprise a computer or the like. The software may comprise a server or client version of voice analysis platform software loaded and executed within each of the computing devices. For example, the first VAP 104 may comprise a server version of voice analysis platform software installed in its computing device while the second VAP 128 may comprise a client version of voice analysis platform software installed in its respective computing device. It is contemplated that in other embodiments, multiple voice analysis platforms may be implemented over a multiplicity of endpoints, one of which may comprise a computing device utilizing a server version of the voice analysis platform software. The other endpoints may comprise computing devices utilizing client versions of the voice analysis platform software. The voice analysis platforms 104, 128 may communicate between each other by way of a suitable communication protocol such as an Ethernet protocol over a local area network (LAN) or wide area network (WAN). One of the voice analysis platforms 104, 128 may be configured to act as a server (running the server version of voice analysis platform) while the other may be configured to act as a client (running the client version). The server may properly configure the client prior to initiating a test. Any configuration changes may be provided to the client in preparation for transmitting a particular reference speech sample. Such configuration changes may include the point at which the reference speech sample is to be tapped within a gateway. The configuration information may prompt a gateway to output the reference speech sample at a particular processing point to one or more voice analysis platforms 104, 128.

Analyses provided by the voice analysis platforms 104, 128 include generating a voice quality score. The voice quality score may be displayed over time in a graphical format. It is contemplated that the voice quality score may be graphically portrayed in relation to the voice quality score of the reference speech sample waveform. In addition, other statistical information, such as an average voice quality score over time and variance of calculated scores may be displayed. It is contemplated that the scores may be displayed according to the type of reference speech sample transmitted through the communication system and the algorithm employed.

One or more remote versions of the voice analysis platform software may be installed in the transmit or receive side voice over IP gateways 112, 120 to facilitate configuration changes to the gateways 112, 120 by the voice analysis platforms 104, 128. The voice over IP gateways 112, 120 function as signal processing devices, implementing one or more signal processing elements, configured to process a reference speech sample for effective transmission through the communication system. A server, by way of its software, may control one or more clients or one or more voice over IP gateways 112, 120. The voice over IP gateways 112, 120 may each comprise a computing device such as a computer. The server version of software may be configured to provide administrative access to making configuration changes and to provide control of one or more remote and/or client versions of software. For example, the server software may be able to facilitate generation of one or more signal processing outputs provided by the voice over IP gateways 112, 120 by communicating to the remote version of voice analysis platform software running in the voice over IP gateways 112, 120. Each of the voice over IP gateways 112, 120 may output the reference speech sample at particular signal processing points within each gateway. In this fashion, one or more signal processing operations performed at each voice over IP gateway may be monitored. These outputs may be received by the voice analysis platforms 104, 128 by way of suitable network interfaces. The network interfaces may communicate to the voice analysis platforms 104, 128 by way of a packet switched wide area network and/or a local area network. The reference speech sample outputs may be incorporated into one or more packet switching protocols as a method of transmitting the reference speech sample to the voice analysis platforms 104, 128. Exemplary RTP and RTCP protocols may be used to transmit the reference speech through an exemplary packet switched network. Furthermore, the voice analysis platforms 104, 128 may be optionally used to test a PSTN based network that does not incorporate any voice over IP gateways. The embodiment illustrated in FIG. 1a allows voice quality scores to be generated when the communication system connects two distinct locations. A voice quality test of the communication system may be performed bi-directionally. In this embodiment, a voice quality score of the entire communication system may be determined by transmitting the reference speech sample from the first VAP 104 to the second VAP 128. Similarly a voice quality score may be determined by transmitting the reference speech sample from the second VAP 128 to the first VAP 104.

Figure 1B:
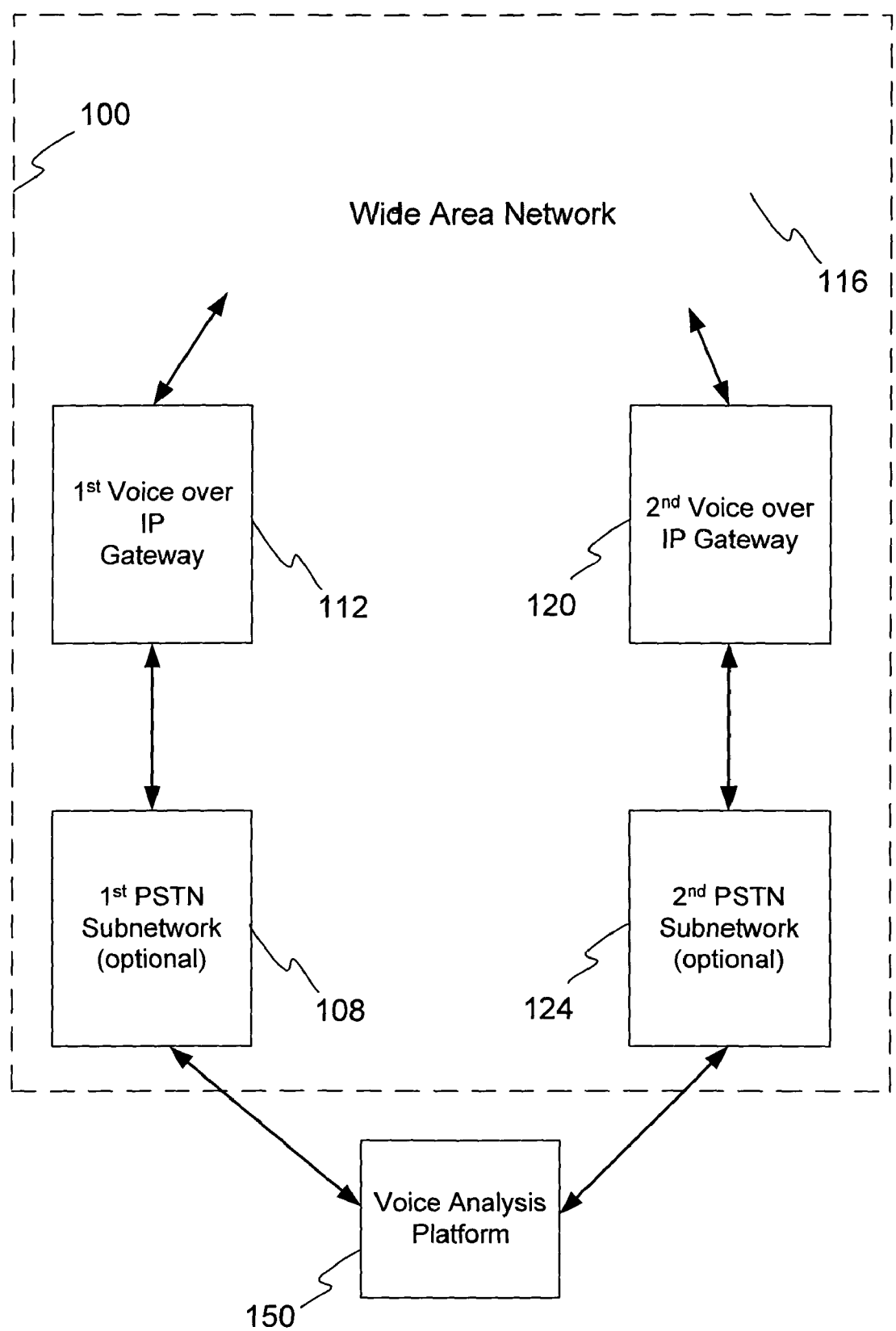
FIG. 1b is a block diagram of a voice test communication system utilizing a voice analysis platform in accordance with an embodiment of the invention.

FIG. 1b is a block diagram of a modified test configuration of the same communication system 100 in accordance with an embodiment of the invention. In this embodiment, a single voice analysis platform 150 is used to assess voice quality of the communication system 100 under test. This particular test configuration may be used in an exemplary laboratory test setup and may be used to assess voice quality characteristics of the voice over IP gateways 112, 120, other signal processing elements, or like devices. The voice analysis platform 150 transmits a reference speech sample through the voice communication system 100 and back to itself. As illustrated, reference speech samples may be transmitted bi-directionally and associated voice quality scores may be determined. Similar to that shown in FIG. 1a, FIG. 1b illustrates the voice analysis platform 150 communicating to the voice over IP gateways 112, 120 by way of optional exemplary first PSTN and second PSTN subnetworks 108, 124. The voice analysis platform 150 may comprise a computing device running a voice analysis platform software. The voice analysis platform software may comprise a server version of voice analysis platform software.

Figure 2:
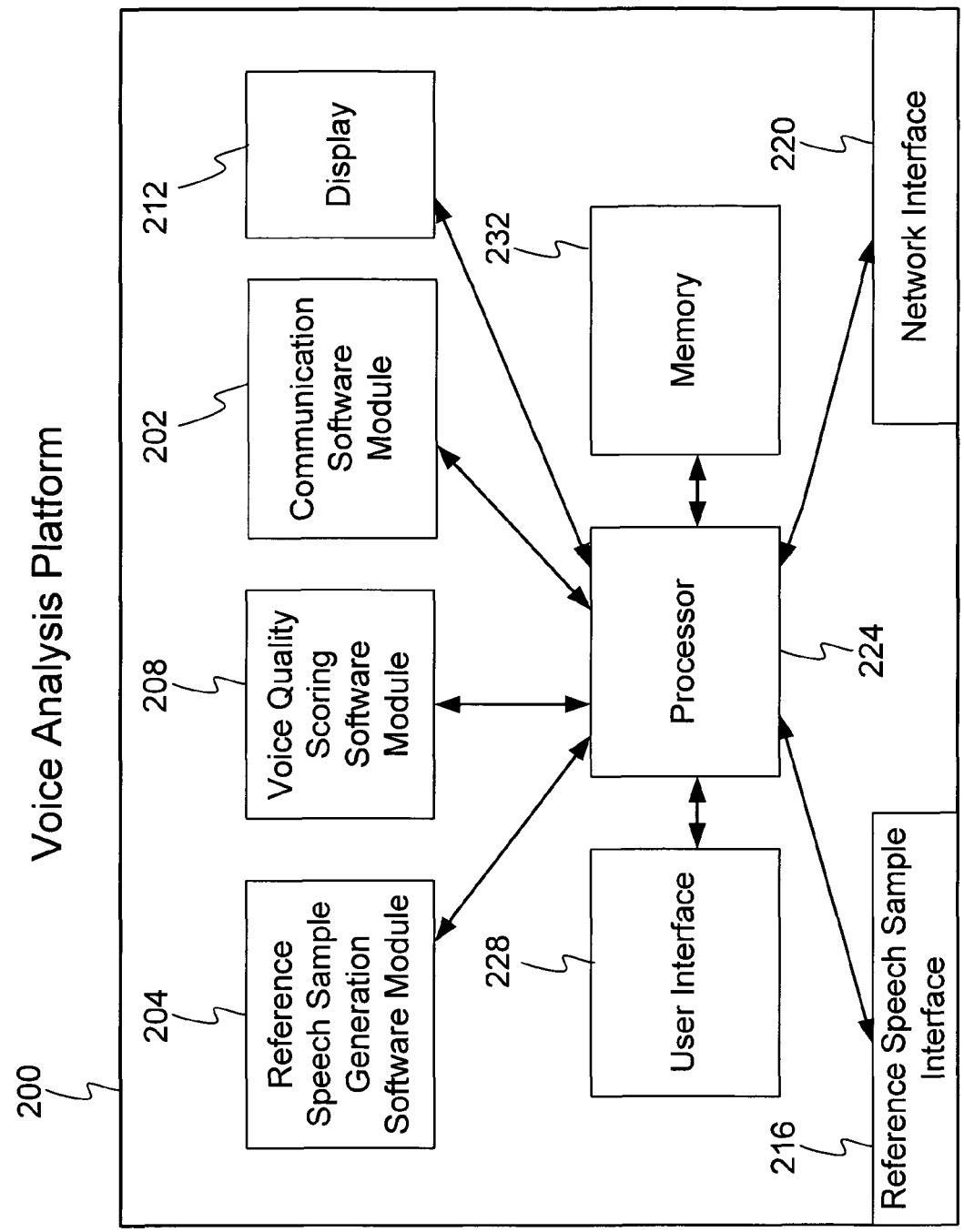
FIG. 2 is a block diagram illustrating a voice analysis platform in accordance with an embodiment of the invention.

FIG. 2 is a block diagram illustrating a voice analysis platform 200 in accordance with an embodiment of the invention. The voice analysis platform 200 may comprise any type of computing device capable of generating a voice quality score by transmitting, receiving, and analyzing a reference speech sample. As shown, the voice analysis platform 200 comprises a communication software module 202, a speech sample generation software module 204, a voice quality scoring software module 208, a display 212, a reference speech sample interface 216, a network interface 220, a processor 224, a user interface 228, and a memory 232. The communication software module 202 facilitates communication between one or more voice analysis platforms 200 and one or more gateways that utilize and run the communication software module 202. The communication software module 202 comprises communication software that provides configuration data from the voice analysis platform 200 to a signal processing device such as a gateway. The gateway may comprise a voice over IP gateway. The signal processing device may be any device within the communication system capable of outputting the reference speech sample at a particular processing point. The configuration data by way of input provided by a user, may instruct the gateway to transmit an output of the reference speech sample at a particular signal processing point within the gateway. The user may input one or more parameters, by way of the user interface 228, specifying which outputs from which gateway the reference speech sample will be obtained from. The outputs are transmitted to a specified voice analysis platform where a voice quality analysis is performed and voice quality scores are generated. The speech sample generation software module 204 comprises speech sample generation software capable of generating one or more reference speech sample files (a particular file may comprise a sampled recording of an utterance of particular duration) to be transmitted through a communication system such as the one previously described in reference to FIG. 1. The speech files may be phrases or sentences spoken in one or more languages by one or more speakers, either male or female. In one example, the reference speech sample files may be phonetically balanced utterances suitable for testing the voice communication system. The speech files may be phrases chosen from one of several different languages. The voice quality scoring software module 208 comprises voice quality scoring software that may generate one or more voice quality scores of the transmitted reference speech sample at various points along the voice communication system. The voice quality scoring software module 208 generates a score by comparing the reference speech sample obtained at a particular point in the voice communication system with the reference speech signal that was input into the voice communication system. For example, the voice quality scoring software module 208 may employ one or more different algorithms that generate corresponding scores. For example, an algorithm, such as PESQ (perceptual evaluation of speech quality) may generate scores between the values of −0.5 and 4.5. Using this algorithm, a score of 4.5 may represent speech of highest quality or intelligibility, while a score of −0.5 may represent speech of very poor quality or intelligibility. Of course, other algorithms may employ different scoring scales. Other exemplary algorithms include PSQM (perceptual speech quality measurement), PAMS (perceptual analysis measurement system), or the like. One or more of these algorithms may be applied to the reference speech sample and graphically displayed.

The display 212 may comprise any type of system configured to display information (such as a graphical user interface) to a user. The display 212 may comprise a monitor or like device. The voice analysis platform 200 may provide a reference speech sample interface 216 capable of transmitting or receiving a reference speech sample to and from a communication system under test. The reference speech sample interface 216 may interface with an exemplary public switched telephone network (PSTN). The reference speech sample interface 216, for example, may comprise FXO/FXS, E&M, E1, T1, or like type of interfaces. The voice analysis platform 200 may also provide a network interface 220 capable of communicating with one or more signal processing elements of one or more gateways. In response to a request generated by configuration data provided by the communication software module 202 of the voice analysis platform 200, the network interface 220 may receive outputs generated by one or more signal processing elements of one or more gateways. The network interface 220 may facilitate the transport of one or more communication protocols. The processor 224 provides computational functions for the voice analysis platform 200. The processor 224 connects to and communicates with the speech sample generation software module 204, the voice quality scoring software module 208, the display 212, the reference speech sample interface 216, the network interface 220, the processor 224, the user interface 228, and the memory 232. Inputs into the voice analysis platform may be facilitated by the user interface 228 which may comprise a graphical user interface and an input device such as a keyboard and/or mouse. The memory 232 provides storage for data processing by the processor 224 during execution of software in either the speech sample generation software module 204 or the voice quality scoring software module 208.

Figure 3:
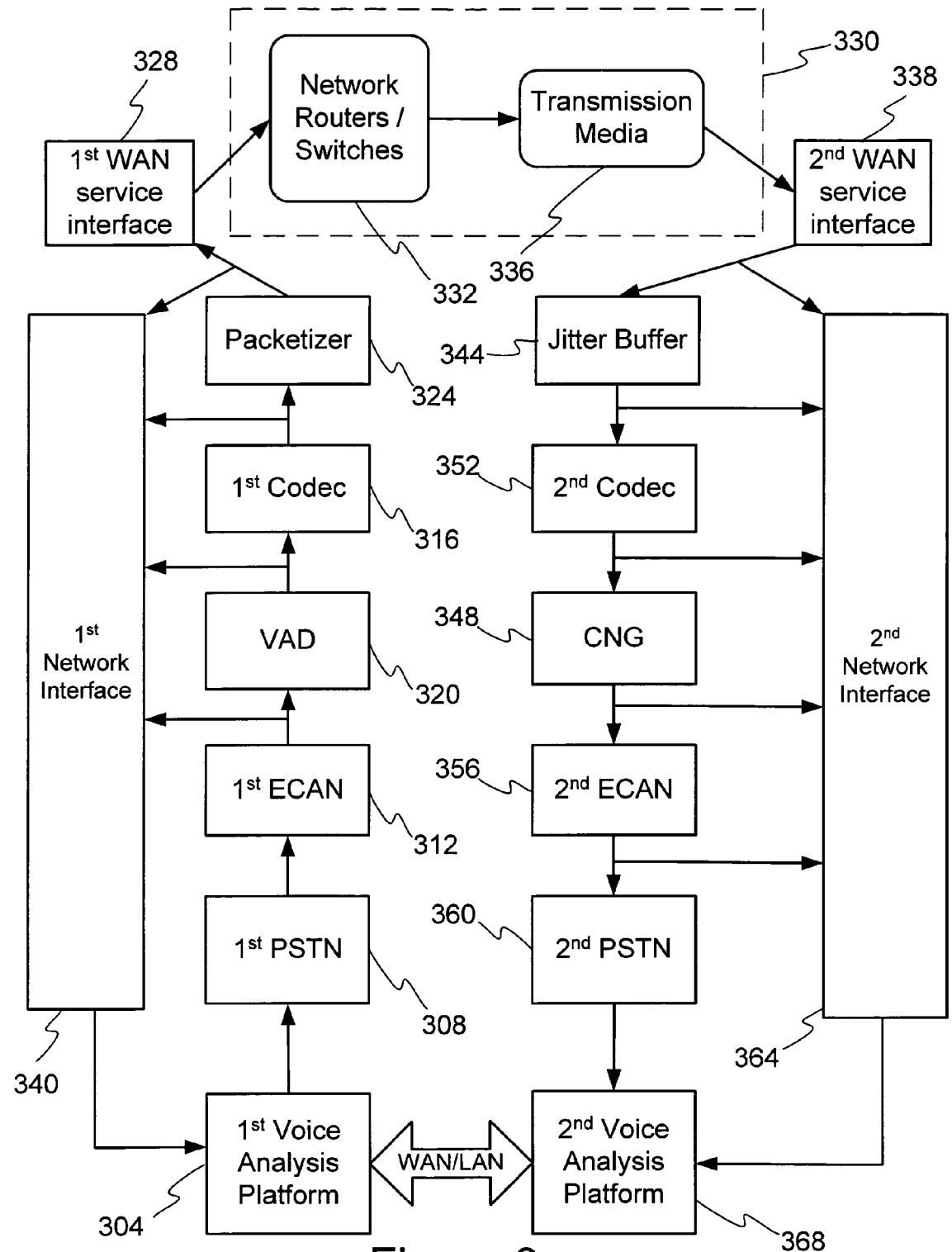
FIG. 3 is a block diagram of an exemplary voice test communication system illustrating a transmission path taken by a reference speech sample in accordance with an embodiment of the invention.

FIG. 3 is a block diagram of an exemplary voice test communication system illustrating a transmission path taken by streaming voice data in accordance with an embodiment of the invention. FIG. 3 depicts one or more exemplary processing elements used in transmitting the reference speech sample from a first voice analysis platform 304 to a second voice analysis platform 368. It is contemplated that the types and number of these exemplary processing elements may differ depending on the exemplary voice test communication system. In one embodiment, the processing elements may be implemented by way of a computing device such as a voice over IP gateway. In this embodiment, the voice analysis platform 304 transmits one or more reference speech samples to a first public services telephone network (PSTN) 308. The reference speech sample may be affected by an exemplary background noise that is added to the reference speech sample. The added background noise may degrade voice quality of the reference speech sample. In addition, the reference speech sample may be introduced to line echo caused by a hybrid junction. The line echo may have a significant effect on speech quality if not adequately removed by an echo canceller. Although not indicated, it is contemplated that other forms of voice quality degradation may occur at the first PSTN 308. Such voice quality degradation may occur by way of signal loss, cross talk, and the like.

The reference speech sample is further transmitted to an exemplary first echo canceller (ECAN) 312 from the first PSTN 308. The first echo canceller 312 may be implemented within an exemplary voice over IP gateway as was described earlier in FIG. 1. In general, the first echo canceller 312 may cancel one or more echoes caused by an electrical mismatch between transmission media in one or more portions of the network. Echo processing may introduce distortion to the reference speech sample transmitted through the communication system. Echo cancellers utilizing the G.165 and G.168 standards may be employed, for example.

Subsequently, the reference speech sample is transmitted to an exemplary voice activity detector (VAD) 320. To more efficiently use bandwidth, a voice activity detector (or VAD) 320 is used to suppress the packetization of voice signals between individual speech utterances (i.e. during the silent periods) within a voice conversation. The VAD 320 generally operates on the transmit side of a gateway, and may be configured to trigger when reaching a particular threshold. If the VAD 320 is not operating correctly it may reduce the voice quality of a reference speech sample. Excessive front end clipping (FEC), for example, may cause distortion in the reference speech sample signal. Excessive hold-over time (HOT) reduces bandwidth efficiency, while short hold-over times may produce choppy speech utterances. Such effects, when realized, may cause a degradation in the voice quality of the reference speech sample transmitted through the communication system under test.

Thereafter, the reference speech sample is transmitted to an exemplary first codec 316 where the reference speech sample is compressed according to one or more compression standards. Again, the first codec may be implemented in the previously described VoIP gateway. The first codec 316 may process the reference speech sample using the following exemplary ITU G.7XX standards: G.711, G.722, G.723, G.726, G.729. The first codec 316 acts as an encoder to encode the reference speech sample using one of these standards. In performing its processing, the first codec 316 may introduce varying levels of voice quality degradation. The degradation may be associated with the type of compression used. It is contemplated that the first codec 316 is inactive when the VAD 320 is triggered.

Thereafter, the reference speech sample is transmitted to an exemplary packetizer 324 that packages the payload and applies an appropriate header and trailer prior to transmitting the reference speech sample to a wide area network. The first codec may be implemented within the previously described VoIP gateway. It is contemplated that packetization errors may comprise one or more lost or reordered packets. One or more types of packets may be generated for transmission to an appropriate wide area network service by way of a first wide area network service interface 328. In one exemplary embodiment, the reference speech sample is packetized and transmitted by way of an appropriate protocol, such as an exemplary Real Time Protocol (RTP), suitable for voice transmission. The reference speech sample packets are further transmitted through a wide area network (WAN) service 330 by way of an exemplary ATM, frame relay, or Internet based network infrastructure.

While traversing the WAN, the reference speech sample packets may encounter a number of exemplary network switches and routers 332. Processing at a router or a switch may have an effect on speech quality. For example, any switching and/or routing delays may cause one or more reference speech sample packets to be discarded. A lost packet may have a significant effect on speech quality. In another example, the traffic capacity of a network may exceed the handling capacity of one or more network routers or switches, effectuating a loss of packets.

The reference speech sample may be transmitted over various transmission media 336 while traversing the WAN. The transmission media 336 may have an effect on the voice quality of the reference speech sample. For example, if the transmission media 336 is damaged, the voice quality of the reference speech sample may be reduced. In another example, long transmission distances of the transmission media 336 may cause signal attenuation resulting in distortion of the transmitted reference speech sample corresponding to reduced voice quality and a lowered voice quality score. After traversing the WAN, the reference speech signal exits the WAN by way of a second WAN service interface 338.

A network interface 340 is illustrated on the transmit side of the voice communication system under test. The network interface 340 provides a communication interface between the exemplary processing elements previously described (i.e., ECAN 312, codec 316, VAD 320, and packetizer 324) and the voice analysis platform 304. The network interface 340 may be attached to the computing device that implements the voice over IP gateway. The ECAN 312, codec 316, VAD 320, and packetizer 324 may provide outputs, as shown, that are transmitted back to the voice analysis platform 304. The voice analysis platform 304 may subsequently generate one or more voice quality scores by comparing one or more of these outputs, containing the captured reference speech sample, to the originally transmitted reference speech sample.

After exiting the WAN, the reference speech sample packets are received by a jitter buffer 344 that acts to smooth out delay variances in the received reference speech sample. Inadequate jitter buffer size may significantly affect the voice quality of the reference speech sample. In certain cases, packets may be dropped, resulting in significant drops in voice quality. In other instances, the time characteristics of the reference speech sample may be altered.

Thereafter, the reference speech sample is transmitted to an exemplary receive side second codec 352 complementary to that of the transmit side first codec 316 described earlier. Again, the second codec 352 may be implemented within the previously described VoIP gateway. The second codec 352 decodes the signal that was previously encoded by the first codec 316. The signal is decoded using the same standard used to encode the signal by the first codec 316. In processing the received reference speech sample, the second codec 352 may introduce varying levels of voice quality degradation. The degradation may be associated with the type of compression algorithm used.

Complementary to the transmit-side VAD 320 previously described, an exemplary Comfort Noise Generator (CNG) 348 generates a local comfort noise signal to the listener during silent periods. If the CNG 348 functions abnormally, noise may be generated during periods of speech transmission, causing distortion of the reference speech sample transmitted. This may result in a reduction of speech quality.

The reference speech sample is further transmitted to an exemplary second echo canceller (ECAN) 356 from the second codec 352. The second echo canceller 356 may be implemented within an exemplary computing device that functions as a voice over IP gateway. The echo cancellers 312, 356 may utilize ITU G.165 and G.168 standards, for example.

Thereafter, the reference speech sample is transmitted to the second PSTN 360. The reference speech sample may be affected by an exemplary background noise that is added to the reference speech sample. It is contemplated that other forms of voice quality degradation may occur at the second PSTN 360. Such voice quality degradation may occur by way of signal loss, cross talk, and the like.

The reference speech sample is received by the second voice analysis platform 368 from the second PSTN 360. The second voice analysis platform 368 analyzes the received reference speech sample and calculates a voice quality score. The voice quality score may be displayed by way of a graphical display provided by an exemplary monitor.

A second network interface 364 is illustrated on the receive side of the voice communication system under test. The network interface 364 provides a communication interface between the exemplary VoIP gateway processing elements and the voice analysis platform 368. The receive side voice over IP gateway may facilitate transmitting one or more outputs from the second ECAN 356, second codec 352, CNG 348, and jitter buffer 344, as shown in FIG. 3, back to the second voice analysis platform 368, where a voice quality score may be generated. Further, the output of the second WAN service interface 338 may be ported through the second network interface 364 to the second voice analysis platform 368. The voice analysis platform 368 may subsequently generate one or more voice quality scores based on the one or more reference speech sample output(s) it receives from the voice communication system under test.

The embodiment illustrated in FIG. 3 depicts a communication system whose endpoints are not co-located. It is further contemplated that a configuration similar to that provided by the embodiment of FIG. 1b may be implemented when the endpoints of the voice communication system are co-located. As discussed previously, the embodiment comprises a single voice analysis platform connected to a voice communication system under test. This type of configuration may be used in a laboratory environment.

Figure 4A:
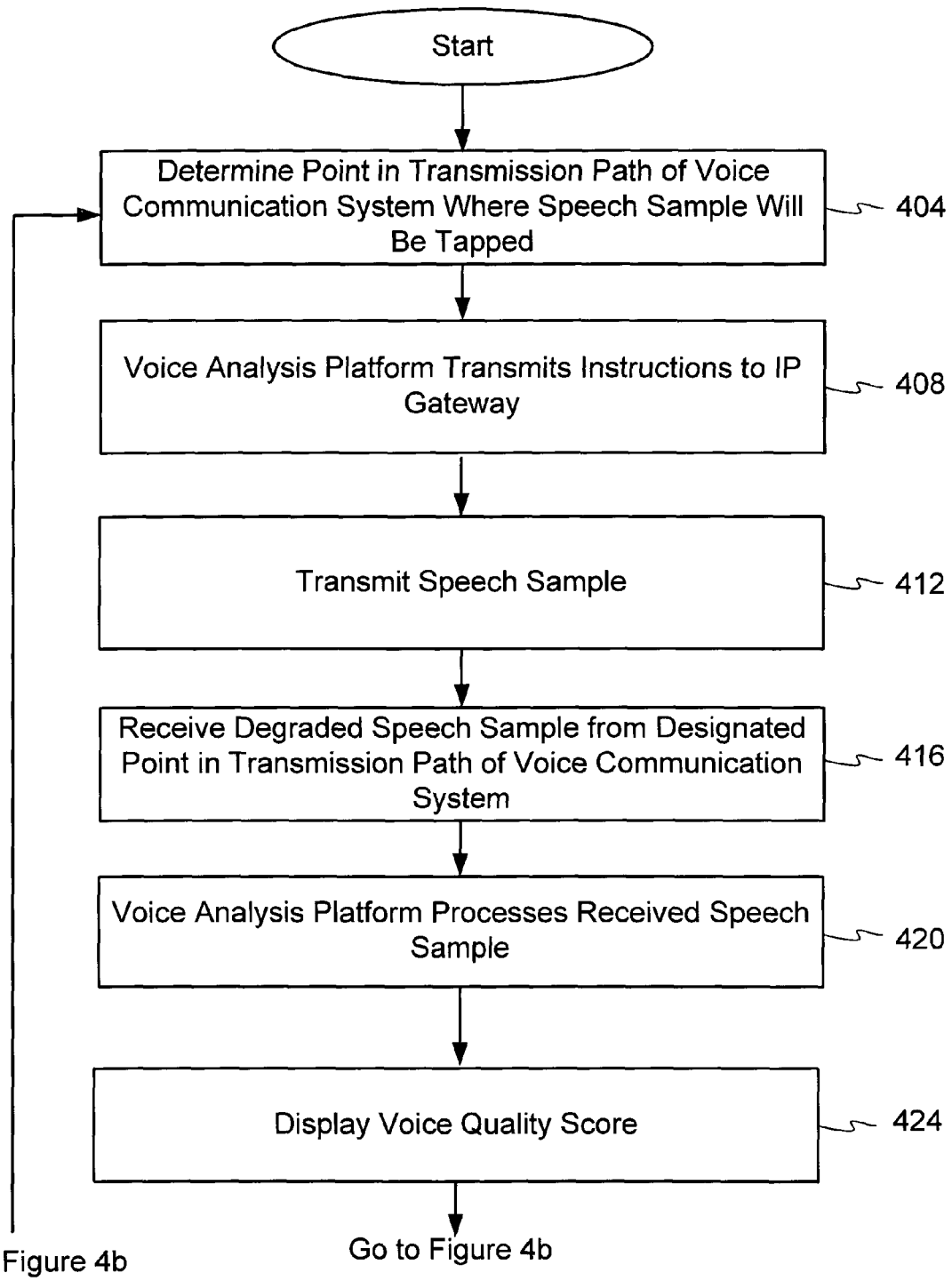
FIG. 4a is an operational flow diagram illustrating an exemplary method of assessing voice quality of service in accordance with an embodiment of the invention.
Figure 4B:
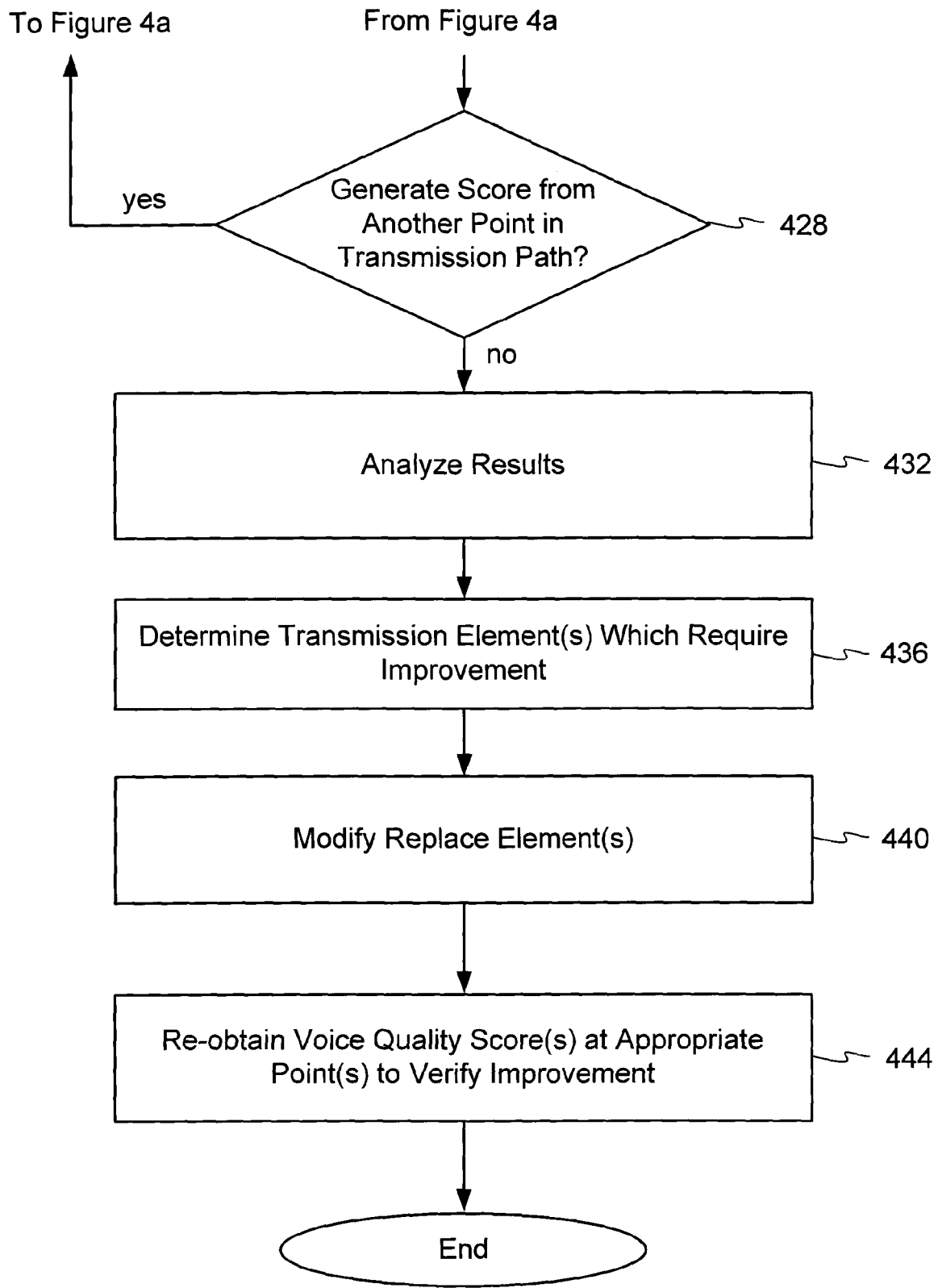
FIG. 4b is an operational flow diagram illustrating an exemplary method of assessing voice quality of service in accordance with an embodiment of the invention.

FIG. 4a is an operational flow diagram illustrating an exemplary method of assessing voice quality of service in accordance with an embodiment of the invention. At step 404, a user determines a point in the voice communication system where a transmitted reference speech sample will be tapped. At step 408, the user may input instructions by way of the user interface of the voice analysis platform, thereby specifying an output of a signal processing element that is to be tapped. The voice analysis platform subsequently transmits the instructions to the appropriate voice over IP gateway or other device of the communication system. In one embodiment, network processing elements such as routers and/or switches may be configured to provide such outputs when loaded with enabling software compatible to that of the software resident in the voice analysis platform. At step 412, the voice analysis platform transmits a reference speech sample designated by the user. At step 416, the voice analysis platform receives the reference speech sample from a point in the voice communication system under test. The reference speech sample may be transmitted from a particular processing element (in a particular voice over IP gateway), for example, by way of control established through use of a remote version of the voice analysis platform software installed at the voice over IP gateway. The reference voice sample may be appropriately filtered and captured by the voice over IP gateway. The captured reference speech sample may be transmitted to the voice analysis platform by way of any network such as a packet switched network. At step 420, the voice analysis platform processes the received reference speech sample output. At step 424, the voice analysis platform displays voice quality scores generated by a specified algorithm. The score may be displayed graphically over time and may include an average voice quality score over the duration of the reference speech sample. Proceeding to FIG. 4b, at step 428, the user may wish to generate another voice quality score from another point along the transmission path of the communication system. If the user wishes to generate another score from another point, the process reverts back to step 404, wherein the user determines a point in the voice communication system where a reference speech sample will be output from. If the user does not wish to generate an additional voice quality score at another point, the process proceeds to step 432. At step 432, the results of the processing performed by the voice analysis platform may be analyzed by the user. At step 436, the user may determine based on the voice quality scores provided, that one or more processing elements may require improvement. At step 440, one or more processing elements may be modified or replaced. And at step 444, the user may re-obtain voice quality scores at the same points to verify that voice quality has been improved after the modifications or replacements have been made.

Figure 5:
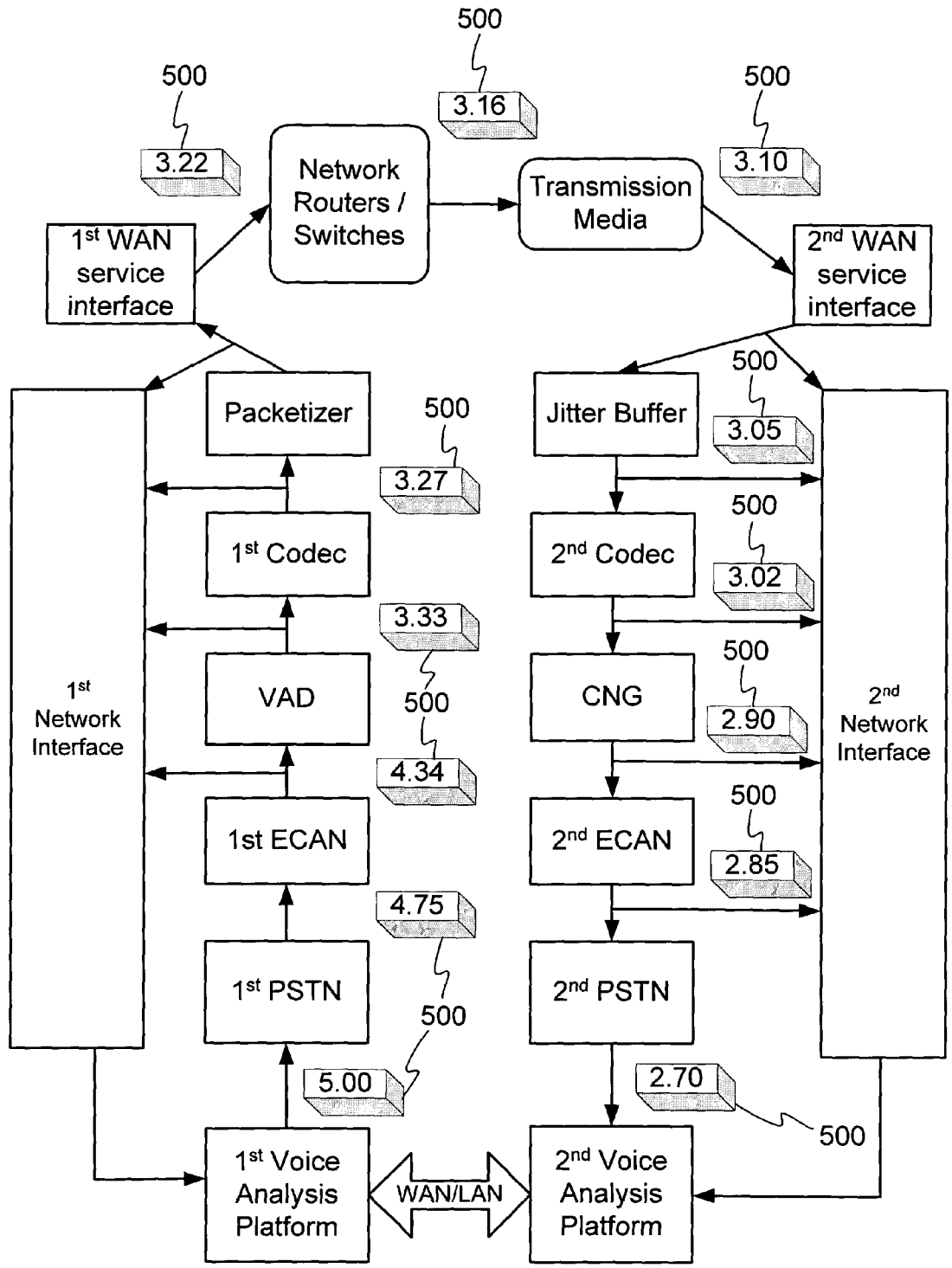
FIG. 5 is an exemplary display provided to a user of a voice analysis platform illustrating exemplary voice quality scores in accordance with an embodiment of the invention.

FIG. 5 is an exemplary display provided to a user of a voice analysis platform illustrating exemplary voice quality scores 500 that are displayed in accordance with an embodiment of the invention. It is contemplated that an exemplary computer monitor may be used to provide the display. As illustrated, the voice quality scores are displayed next to their corresponding processing element outputs. In this embodiment, the voice quality scores vary from 0 (poor voice quality) to 5 (excellent voice quality). As shown, the reference speech sample has a voice quality score of 5.0 prior to being transmitted to the communication system. As the reference speech sample is transmitted through the communication system, the voice quality scores are reduced, signifying degradation in the voice quality. In the embodiment shown, the voice quality score at the receiving end of the voice quality platform is 2.70. By displaying the voice quality scores graphically, a user may easily notice significant variations in voice quality scores over time. In one embodiment, one or more average voice quality scores calculated over the duration of the reference speech sample are displayed adjacent to the appropriate signal processing outputs of the communication system.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of assessing voice quality of a communication system using a voice analysis platform comprising:
   transmitting reference speech samples into said communication system;
   receiving said reference speech samples captured at one or more processing points within a gateway of said communication system; and
   determining voice quality scores based on said captured reference speech samples using said voice analysis platform said transmitting and said receiving performed by said voice analysis platform.

2. The method of claim 1 further comprising displaying said voice quality scores graphically using said voice analysis platform.

3. The method of claim 2 wherein said displaying occurs by way of a graphical user interface.

4. The method of claim 1 further comprising determining and displaying statistical information related to said voice quality scores using said voice analysis platform.

5. The method of claim 4 wherein said statistical information comprises an average voice quality score and a variance.

6. The method of claim 1, wherein said gateway comprises a voice over IP gateway.

7. The method of claim 1 wherein said one or more processing points comprises a codec.

8. The method of claim 1 wherein said one or more processing points comprises a voice activity detector.

9. The method of claim 1 wherein said one or more processing points comprises an echo canceller.

10. The method of claim 1 wherein said one or more processing points comprises a packetizer.

11. The method of claim 1 wherein said one or more processing points comprises a jitter buffer.

12. The method of claim 1 wherein said one or more processing points comprises a comfort noise generator.

13. A system for monitoring degradation of voice quality in a communication system comprising:
   a first voice analysis platform; and
   a second voice analysis platform said first and said second voice analysis platforms used for transmitting and receiving reference speech through said communication system, said communication system comprising a plurality of signal processing elements used to process said reference speech, wherein a network interface is used to communicatively couple the outputs of said plurality of signal processing elements to said first voice analysis platform or said second voice analysis platform, wherein a reference speech sample obtained at an output of a signal processing element of said plurality of signal processing elements is transmitted through said network interface to said first voice analysis platform or said second voice analysis platform, said reference speech sample obtained at said output being used to compute a voice quality score at said first voice analysis platform or said second voice analysis platform wherein at least one of said first voice analysis platform and said second voice analysis platform receives said obtained reference speech sample at said output, said reference speech originating not only from said first voice analysis platform but alternatively from said second voice analysis platform.

14. The system of claim 13 wherein said signal processing element comprises a codec.

15. The system of claim 13 wherein said signal processing element comprises a voice activity detector.

16. The system of claim 13 wherein said signal processing element comprises an echo canceller.

17. The system of claim 13 wherein said signal processing element comprises a packetizer.

18. The system of claim 13 wherein said signal processing element comprises a jitter buffer.

19. The system of claim 13 wherein said signal processing element comprises a comfort noise generator.

20. The system of claim 13 wherein said voice quality score comprises PESQ.

21. The system of claim 13 wherein said voice quality score comprises PAMS.

22. The system of claim 13 wherein said voice quality score comprises PSQM.

23. The system of claim 13 wherein said first voice analysis platform comprises a software module, said software module comprising software that provides configuration data to a gateway, said gateway comprising said one or more signal processing elements, said configuration data used in selecting said output from said outputs for computing said voice quality score at said first voice analysis platform or said second voice analysis platform.

24. A system for monitoring degradation of voice quality in a communication system comprising:
    a voice analysis platform for transmitting and receiving reference speech through said communication system, said communication system comprising a plurality of signal processing elements used to process said reference speech, said voice analysis platform receiving a reference speech sample from an output of a signal processing element of said plurality of signal processing elements, said reference speech originating from said voice analysis platform, said reference speech sample transmitted to said voice analysis platform via a network interface, said network interface used for communicatively coupling said signal processing element to said voice analysis platform, said reference speech sample used to compute a voice quality score.

25. The system of claim 24 wherein said signal processing element comprises a codec.

26. The system of claim 24 wherein said signal processing element comprises a voice activity detector.

27. The system of claim 24 wherein said signal processing element comprises an echo canceller.

28. The system of claim 24 wherein said signal processing element comprises a packetizer.

29. The system of claim 24 wherein said voice quality score comprises PESQ.

30. The system of claim 24 wherein said voice quality score comprises PAMS.

31. The system of claim 24 wherein said voice quality score comprises PSQM.

32. The system of claim 24 wherein said signal processing element comprises a jitter buffer.

33. The system of claim 24 wherein said one or more signal processing elements comprises a comfort noise generator.

34. The system of claim 24 wherein said voice analysis platform comprises a software module, said software module comprising software that provides configuration data to a gateway, said gateway comprising said one or more signal processing elements, said configuration data used in determining said selected output from one or more outputs corresponding to said one or more signal processing elements.

35. A method of assessing voice quality at various points along a communication system comprising:
    transmitting a reference speech between a first voice analysis platform and a second voice analysis platform via at least one gateway;
    monitoring an output of a plurality of signal processing elements of said at least one gateway;
    transmitting a reference speech sample from said output to said first voice analysis platform or said second voice analysis platform; and
    using said reference speech sample to generate a voice quality score by said first voice analysis platform or said second voice analysis platform wherein at least one of said first voice analysis platform and said second voice analysis platform receives said reference speech sample at said output, said reference speech originating not only from said first voice analysis platform but alternatively from said second voice analysis platform.

36. The method of claim 35 further comprising displaying said voice quality score graphically.

37. The method of claim 36 wherein said displaying occurs by way of a graphical user interface.

38. The method of claim 35 further comprising determining and displaying statistical information related to said voice quality score.

39. The method of claim 38 wherein said statistical information comprises an average voice quality score and one or more variances.

40. The method of claim 35 wherein said voice quality score is generated using a PESQ algorithm.

41. The method of claim 35 wherein said voice quality score is generated using a PAMS algorithm.

42. The method of claim 35 wherein said voice quality score is generated using a PSQM algorithm.

* * * * *